us008959212B2

(12) United States Patent  (10) Patent No.: US 8,959,212 B2
Lientz  (45) Date of Patent: Feb. 17, 2015

(54) SYSTEMS AND METHODS FOR PERFORMING LOCALIZED SERVER-SIDE MONITORING IN A CONTENT DELIVERY NETWORK

(71) Applicant: EdgeCast Networks, Inc., Santa Monica, CA (US)

(72) Inventor: Andrew Lientz, Bellevue, WA (US)

(73) Assignee: EdgeCast Networks, Inc., Santa Monica, CA (US)

( * ) Notice: Subject to any disclaimer, the term of this patent is extended or adjusted under 35 U.S.C. 154(b) by 0 days.

(21) Appl. No.: 14/147,117

(22) Filed: Jan. 3, 2014

(65) Prior Publication Data

US 2014/0122711 A1    May 1, 2014

Related U.S. Application Data

(63) Continuation of application No. 13/527,397, filed on Jun. 19, 2012, now Pat. No. 8,626,910.

(51) Int. Cl.
    *G06F 15/173* (2006.01)
    *H04L 12/26* (2006.01)
    *H04L 12/24* (2006.01)

(52) U.S. Cl.
    CPC ........ *H04L 43/0888* (2013.01); *H04L 41/0896* (2013.01)
    USPC ............ 709/224; 709/233; 370/235; 370/252

(58) Field of Classification Search
    USPC .......................... 709/224, 233; 370/235, 252
    See application file for complete search history.

(56) References Cited

U.S. PATENT DOCUMENTS

| 5,732,219 | A | 3/1998 | Blumer et al. |
| 5,991,735 | A | 11/1999 | Gerace |
| 6,076,113 | A | 6/2000 | Ramanathan et al. |
| 6,078,956 | A * | 6/2000 | Bryant et al. ................. 709/224 |
| 6,108,703 | A | 8/2000 | Leighton et al. |
| 6,269,401 | B1 | 7/2001 | Fletcher et al. |
| 6,415,368 | B1 | 7/2002 | Glance et al. |
| 6,446,028 | B1 * | 9/2002 | Wang ............................ 702/186 |
| 6,553,413 | B1 | 4/2003 | Leighton et al. |
| 6,601,098 | B1 | 7/2003 | Case et al. |
| 6,625,647 | B1 | 9/2003 | Barrick et al. |
| 6,701,363 | B1 * | 3/2004 | Chiu et al. .................... 709/224 |
| 6,757,255 | B1 * | 6/2004 | Aoki et al. .................... 370/252 |
| 6,763,321 | B2 | 7/2004 | Gross et al. |
| 6,763,380 | B1 | 7/2004 | Mayton et al. |
| 6,901,051 | B1 * | 5/2005 | Hou et al. ..................... 370/231 |
| 6,909,693 | B1 * | 6/2005 | Firoiu et al. .................. 370/235 |
| 7,103,645 | B2 | 9/2006 | Leighton et al. |
| 7,640,358 | B2 | 12/2009 | Deshpande |

(Continued)

*Primary Examiner* — Tammy Nguyen

(57) ABSTRACT

Some embodiments provide systems and methods for performing localized and real-time server-side network performance monitoring. These systems and methods leverage the distributed architecture of a content delivery network (CDN) so as to perform distributed monitoring with each Point-of-Presence of the CDN responsible for monitoring performance to a localized set of end users. These systems and methods also leverage existing traffic flows from a server to a particular end user in order to perform real-time server-side network performance monitoring without the injection of specialized monitoring packets and without active involvement of the end user in deriving the performance measurements. The performance measurements are then used to optimize delivery of existing and future traffic flows to the end user.

21 Claims, 8 Drawing Sheets

(56) References Cited

U.S. PATENT DOCUMENTS

| | | |
|---|---|---|
| 7,693,959 B2 | 4/2010 | Leighton et al. |
| 7,779,146 B2 * | 8/2010 | Deshpande ............... 709/233 |
| 7,908,362 B2 | 3/2011 | Ferguson et al. |
| 8,019,886 B2 | 9/2011 | Harrang et al. |
| 8,209,728 B2 | 6/2012 | Liu et al. |
| 8,339,947 B2 | 12/2012 | Lee et al. |
| 2001/0010059 A1 | 7/2001 | Burman et al. |
| 2002/0059456 A1 | 5/2002 | Ha et al. |
| 2002/0059458 A1 | 5/2002 | Deshpande et al. |
| 2002/0083188 A1 | 6/2002 | Hericy et al. |
| 2002/0099816 A1 | 7/2002 | Quarterman et al. |
| 2002/0169868 A1 | 11/2002 | Lopke et al. |
| 2003/0046383 A1 | 3/2003 | Lee et al. |
| 2003/0115421 A1 | 6/2003 | McHenry et al. |
| 2003/0221000 A1 | 11/2003 | Cherkasova et al. |
| 2004/0153561 A1 | 8/2004 | Dalal et al. |
| 2006/0136578 A1 | 6/2006 | Covell et al. |
| 2010/0020685 A1 | 1/2010 | Short et al. |
| 2010/0034089 A1 | 2/2010 | Kovvali et al. |
| 2010/0235542 A1 | 9/2010 | Visharam et al. |
| 2011/0167170 A1 | 7/2011 | Kovvali et al. |
| 2011/0191414 A1 | 8/2011 | Ma et al. |
| 2012/0002541 A1 | 1/2012 | Lee et al. |
| 2012/0117235 A1 | 5/2012 | Castro Castro et al. |
| 2012/0327816 A1 | 12/2012 | Morrill et al. |

* cited by examiner

SYSTEMS AND METHODS FOR PERFORMING LOCALIZED SERVER-SIDE MONITORING IN A CONTENT DELIVERY NETWORK

CLAIM OF BENEFIT TO RELATED APPLICATIONS

This application is a continuation of the U.S. non-provisional application Ser. No. 13/527,397, entitled "Systems and Methods for Performing Localized Server-Side Monitoring in a Content Delivery Network", filed Jun. 19, 2012. The contents of application Ser. No. 13/527,397 are hereby incorporated by reference.

TECHNICAL FIELD

The present invention relates to monitoring network performance and, more specifically, to performing localized server-side performance monitoring in a content delivery network.

BACKGROUND ART

The data networks collectively forming the Internet are becoming or already are the primary means for communication, commerce, as well as accessing news, music, videos, applications, games, and other content. However at times, access to such content is delayed as a result of over-loaded links, downed links, limited bandwidth, congestion, or other lack of resources in the intervening links between a source providing the content and a destination requesting and receiving the content.

Contributing to this slowdown are increasing numbers of users having numerous network enabled devices (e.g., desktops, laptops, tablets, smartphones, etc.), each of which are provided ever faster interfaces with which to consume content. Also contributing to the slowdown are increasing amounts of new and/or feature-rich content that requires greater bandwidth for delivery. In other words, there is both an increase in the demand for content as well as an increase in supply of consumable content.

To counteract this slowdown, network operators have deployed data networks having greater bandwidth as well as more powerful and/or efficient networking resources. This is nowhere more evident than in the rapid evolution of cellular data networks. Within a relatively short time frame, these data networks have evolved from 2G (e.g., General Packet Radio Service (GPRS) and Enhanced Data Rates for GSM Evolution (EDGE)), to 3G (e.g., High Speed Packet Access (HSPA)), to the current 4G (e.g., Long Term Evolution (LTE)) data networks. Still, there is a need to more efficiently deliver the content as the supply and demand for content outpaces network evolution and the exorbitant costs of continual network evolution have slowed down the network evolution relative to the growth of the supply and demand for content. To that end, content delivery networks (CDNs) have been deployed throughout the Internet infrastructure.

A CDN accelerates the delivery of content by reducing the distance that content travels in order to reach a destination. The CDN strategically locates surrogate origin servers, also referred to as caching servers or edge servers, at various points-of-presence (PoPs) that are geographically proximate to large numbers of content consumers. The CDN then utilizes a traffic management system to route requests for content hosted by the CDN to the edge server that can optimally deliver the requested content to the content consumer. As used hereafter optimal delivery of content refers to the most efficient available means with which content can be delivered from a server to an end user machine over a data network. Optimal delivery of content can be quantified in terms of latency, jitter, packet loss, distance, and overall end user experience.

Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content provider deliver the requested content. For example, a CDN may locate edge servers in Los Angeles, Dallas, and New York. These edge servers may cache content that is published by a particular content provider with an origin server in Miami. When a content consumer in San Francisco submits a request for the published content, the CDN will deliver the content from the Los Angeles edge server on behalf of the content provider as opposed to the much greater distance that would be required when delivering the content from the origin server in Miami. In this manner, the CDN reduces the latency, jitter, and amount of buffering that is experienced by the content consumer.

The edge server can further improve on the end user experience by adaptively adjusting the content that is being delivered to the end user. This may include reducing the bitrate of a media stream (e.g., video) being delivered to an end user when the path to the end user is congested or the performance of the path is otherwise degraded. In so doing, a lower quality stream is delivered to the end user. The lower quality stream ensures that the end user enjoys an uninterrupted experience (by avoiding dropped frames, repeated buffering, etc.). The bitrate can be increased in order to deliver a higher quality stream to the end user when the path from the edge server to end user becomes less congested. Similar adaptive techniques are applicable to other forms of content besides media content (e.g., music and video). For instance, the edge server can further improve the end user experience by adaptively scaling images. Here again, when the path to the end user is congested or otherwise limited, the edge server can improve the end user experience by passing a lower resolution copy or more compressed version of a requested image to the end user, thereby enabling the end user to receive the image quicker than if a higher resolution copy or less compressed version of the requested image were to be passed. Further still, the edge server can improve the end user experience using server-side bandwidth throttling, whereby the server throttles or slows the rate at which it sends content beyond ordinary flow control mechanisms in the protocol stack or in the data network.

To facilitate any form of adaptive content delivery or server-side bandwidth throttling, the CDN edge server needs to be aware of the performance of the underlying data network that links the edge server to the various end users. CDNs either utilize existing network performance monitoring tools or have developed their own systems and methods in order to monitor network performance.

One such network performance monitoring tool is the Keynote system. The Keynote system involves deployment of various agents across the Internet. The agents emulate end users and periodically request (e.g., every ten minutes) and download content from one or more of the CDN edge servers. The Keynote system agents then measure various metrics related to the delivery of that content. However, such systems do not provide accurate performance measurements because the agents do not request and download content from the same network locations as the actual end users. As a result, the performance measurements obtained from the Keynote system do not accurately reflect the network performance that end users experience. More specifically, the Keynote system is unable to measure performance along all network links connecting the end users to the CDN edge servers. Also, such a system does not provide real-time measurements. For instance, the network measurements can be up to 9 minutes and 59 seconds stale when measurements are taken every 10 minutes. Lastly, the system injects additional traffic into the network. This additional traffic is manifested in the form of the requests that are issued by the agents to the edge servers and the responses that the edge servers issue in turn to the system agents. This additional traffic adds to the traffic that is actually requested by and delivered to various end users. The result is increased network congestion and increased load on the edge servers which now have to respond to the monitoring agents in addition to the requests that are submitted by various end users. In other words, specialized packets are injected in the network for the sole purpose of performance monitoring.

One method to improve upon the accuracy of the Keynote system is to take measurements directly from the end users that request content from the CDN. This also involves injecting additional traffic into the network. For example, pinging an end user by sending one or more Internet Control Message Protocol (ICMP) packets to determine a round-trip time to the end user. Such techniques, while accurate in the resulting measurements, add overhead at the server performing the measurements as well as additional traffic load on the data network. While a single ICMP packet is insignificant in consuming server resources and slowing down a network, thousands of such packets continually being sent out from multiple monitoring points (e.g., edge servers) can result in a measurable amount of performance degradation. Moreover, these measurements suffer from staleness as they are often conducted on a periodic basis. Such measurements can be taken in real-time. For example, before responding to a user request for content, pinging the end user. However, this introduces unnecessary delay when actually responding to the end user.

Still some CDNs and network performance monitoring tools have resorted to using so called "client-side" techniques. These techniques usually involve end users performing measurements for the benefit of the CDN or monitoring tool. The CDN may inject a script or set of instructions in the content that is delivered to the end users. The script or set of instructions cause the end users to measure the performance relating to the receipt of content from the CDN whether that content is the content requested by the end users or some token object. The script or set of instructions then cause the end users to report those measurements to the CDN or the monitoring tool. Such techniques may be performed covertly without the end users' knowledge, thereby surfacing issues related to privacy and trust. When end users are made aware of such techniques, most disapprove or disallow execution on their devices as they do not want any unnecessary software from running on their devices, especially when such software is executed for the benefit of some third party.

Accordingly, there is a need for improved systems and methods with which to monitor network performance. There is a need to conduct such monitoring based on existing traffic flows without the introduction of additional traffic, wherein such additional traffic is for the purpose of facilitating network performance monitoring. There is a need to perform such monitoring in real-time without sacrificing accuracy in measuring performance to the end user. Moreover, such monitoring should be based on "server-side" techniques that allow such monitoring to occur without active involvement of the end user. There is also a need to leverage the results from such monitoring in order to further optimize content delivery as provided by a content delivery network.

SUMMARY OF THE INVENTION

It is an object of the embodiments described herein to provide systems and methods for performing localized and real-time server-side network performance monitoring. It is further an object for these systems and methods to leverage the distributed architecture of a content delivery network (CDN) so as to perform distributed monitoring with each Point-of-Presence (PoP) of the CDN responsible for monitoring performance to a localized set of end users. It is further an object for these systems and methods to leverage existing traffic flows from a server to a particular end user in order to perform real-time server-side network performance monitoring without the injection of specialized monitoring packets and without active involvement of the end user in deriving the performance measurements. It is further an object to utilize the performance measurements to optimize delivery of existing and future traffic flows to the end user.

The infrastructure of a distributed platform, such as a CDN, provides the ideal deployment of servers to achieve these and other objects. The CDN includes various PoPs having one or more edge servers. The edge servers of each PoP are proximally located to end users of one or more specific geographic regions. Content requests originating from a geographic region are typically resolved to the PoP that is proximate to that geographic region, thus enabling the edge servers of that PoP to deliver the requested content to the end users originating the content requests.

To leverage the distributed architecture of the CDN, some embodiments enhance each PoP of the CDN with at least one monitoring agent and a database. The monitoring agent measures the performance that is associated with delivering content from one or more edge servers of the PoP to various end users that are routed to that PoP. In some embodiments, the monitoring agent measures outgoing traffic flows at the applications layer (i.e., Layer 7) so as to measure the effective rate at which the content is sent while obfuscating the underlying the lower layer flow control mechanisms. The measurements are real-time and accurately reflect performance experienced by the end user by virtue of the measurements being taken as content is transferred from the edge server to the end user. Measurement accuracy is further realized based on the geographic proximity of the PoP to the end user. This proximity eliminates many of the links or hops that act as variables affecting network performance along the network path connecting the edge server to the end user. This proximity also allows measurements that were taken for a first end user in a geographic region to be overwritten by measurements that are taken for a second end user in the geographic region without loss of accuracy. This is a result of the localization of the PoP to one or more proximal geographic regions which causes content to traverse substantially all if not all of the same network links or hops in order to reach the end users of a particular geographic region.

The monitoring agent stores the derived measurements to the database. The measurements stored to the database are then made accessible to each edge server operating within the same PoP as the database. The edge servers use the measurements to then optimize outgoing traffic flows.

In some embodiments, optimization of a traffic flow involves pre-optimization and/or re-optimization of the traffic flow. An edge server performs pre-optimization of a traffic flow to a first end user based on measurements taken for a second end user that is within the same geographic region as the first end user when no prior measurements have been taken for the first end user or when the prior measurements taken for the end user have exceeded a specified time-to-live. Since all edge servers of a PoP are usually never idle at the same time, there will be at least one real-time measurement to one end user of a specific geographic region that can be used to pre-optimize traffic flows for other end users within that specific geographic region. Once the pre-optimized traffic flow to the first end user begins, the monitoring agent monitors the outgoing traffic flow to the first end user and the edge server re-optimizes the traffic flow based on measurements the monitoring agent derives for the first end user.

In some embodiments, optimization (e.g., pre-optimization and re-optimization) of a traffic flow involves selecting an encoding, bitrate, compression, file size, or other variant of content. Optimization may also involve server-side bandwidth throttling.

In some embodiments, optimization is performed by comparing the real-time measurements against one or more established thresholds. When a real-time measurement surpasses a first threshold, the quality of the content being delivered may be lowered in order to accommodate for worsened network conditions. Alternatively, when a real-time measurement surpasses a second threshold, the quality of the content being delivered may be improved in order to accommodate for better network conditions. The thresholds can be based on an expected set of results or against previously logged performance measurements. The expected set of results may include expected transfer rates that are determined based on the network provider the end user uses to access the CDN. For instance, when the enhanced edge server is deployed as part of a cellular data network, the expected transfer rates may be an expected transfer rate that an end user is likely to receive during ordinary loads when connected to a tower of the cellular data network, a wireless ISP, or overloaded broadband network. The expected transfer rates may also partly or wholly be determined on the geographic location of the end user.

BRIEF DESCRIPTION OF THE DRAWINGS

In order to achieve a better understanding of the nature of the present invention, preferred embodiments for the localized and real-time server-side network performance monitoring systems and methods will now be described, by way of example only, with reference to the accompanying drawings in which.

DETAILED DESCRIPTION

In the following detailed description, numerous details, examples, and embodiments for the localized and real-time server-side network performance monitoring systems and methods are set forth and described. As one skilled in the art would understand in light of the present description, the systems and methods are not limited to the embodiments set forth, and the systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

I. Overview

The embodiments set forth herein provide localized and real-time server-side network performance monitoring systems and methods. Various advantages of these systems and methods are achieved by leveraging the distributed architecture of a content delivery network (CDN), namely the distributed allocation of edge servers of the CDN. Thus, to aid in the discussion that is to follow, an introduction to the distributed architecture of a typical CDN is now provided.

Figure 1:
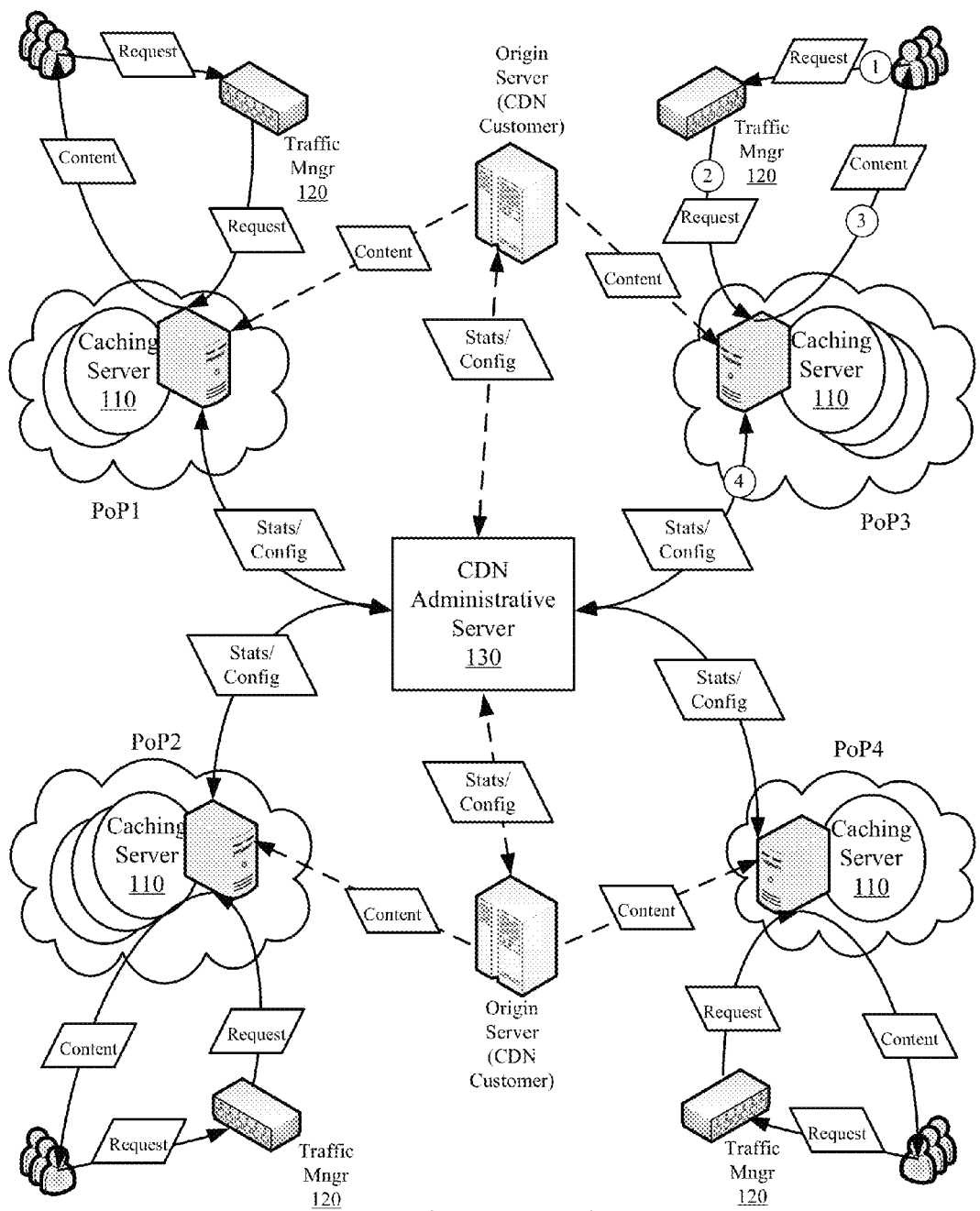
FIG. 1 presents an exemplary CDN infrastructure that includes a distributed set of edge servers, traffic management servers, and an administrative server.

FIG. 1 presents an exemplary CDN infrastructure that includes a distributed set of edge servers 110, traffic management servers 120, and an administrative server 130. The figure also illustrates the interactions that CDN customers including content providers have with the CDN and the interactions that content consumers or end users have with the CDN.

Each edge server of the set of edge servers 110 may represent a single physical machine or a cluster of machines that serves content on behalf of different content providers to end users. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. Each cluster of servers at a particular region may represent a point-of-presence (PoP) of the CDN, wherein an end user is typically routed to the closest PoP in order to download content from the CDN. In this manner, content traverses fewer hops before arriving at the end user, thereby resulting in less latency and an improved overall end user experience.

The traffic management servers 120 route end users, and more specifically, end user issued requests for content to the one or more edge servers 110. Different CDN implementations utilize different traffic management schemes to achieve such routing to the optimal edge server. As one example, the traffic management scheme performs Anycast routing to identify a server from the set of servers 110 that can optimally serve requested content to a particular end user requesting the content. It should be apparent that the traffic management servers 120 can include different combinations of Domain Name System (DNS) servers, load balancers, and routers performing Anycast or Border Gateway Protocol (BGP) routing.

The administrative server 130 may include a central server of the CDN or a distributed set of interoperating servers that perform the configuration control and reporting functionality of the CDN. Content providers register with the administrative server 130 in order to access services and functionality of the CDN. Once registered, content providers can interface with the administrative server 130 to specify a configuration, upload content, and view performance reports. The administrative server 130 also aggregates statistics data from each server of the set of edge servers 110 and processes the statistics to produce usage and performance reports.

As noted above, the distributed architecture of the CDN is an ideal platform from which to perform localized and real-time server-side performance monitoring. Specifically, the allocation of PoPs to different geographic regions provides an ideal partitioning of CDN resources that can be adapted to monitor end users in a decentralized fashion. Each PoP of the CDN is deployed to an edge of the network. A network edge is the primary point of exchange for requests and content that is passed between end users at one or more geographic regions and the larger external data network or Internet. The traffic management functionality of the CDN ordinarily ensures that the end users at an edge of a network or geographic region are served by edge servers of a specific PoP. For instance, the traffic management functionality can utilize Anycast routing or Domain Name System (DNS) resolution to ensure that end users are served by edge servers of the PoP that is geographically closest to them. In so doing, the CDN architecture provides a logical partitioning of the entire set of end users into smaller subsets of related end users, whereby a subset of end users is related primarily by geographic region. This partitioning is also manifested in the allocation of IP addresses to each subset of end users. Ordinarily, each end user from the subset of end users operating from within a particular geographic region is assigned an IP address that is within a particular subnet. Also, these end users are routed to a particular PoP from a network that is assigned a specific Autonomous System (AS) number. These and other addressing parameters can be used to identify end users operating within the same geographic region.

The systems and methods advocated herein leverage the distributed allocation of PoPs in order to decentralize the task of monitoring all end users interfacing with the CDN and to localize the monitoring on a per PoP or per geographic regional basis. In so doing, each PoP is locally responsible for obtaining and updating performance measurements for those end users that are serviced by that PoP. This greatly reduces the number of end users that any given PoP monitors. This also eliminates the taking of redundant measurements, whereby two or more endpoints from within the CDN are used to monitor a single end user endpoint. Moreover, the monitoring is performed over the actual pathways that connect the end users to the CDN, thereby accurately measuring the performance that the end users experience.

To further reduce the overhead on each PoP when deriving the localized network performance measurements, the systems and methods utilize server-side monitoring techniques that derive network performance measurements based on existing traffic flows from an edge server to a particular end user. These server-side techniques do not involve the injection of any additional traffic beyond that which is requested and delivered to the end users. Such server-side techniques are also able to derive performance measurements without requiring active interaction with the end user. Furthermore, real-time monitoring is achieved as a result of monitoring the outbound traffic flows as they are sent.

To implement such localized and real-time network performance monitoring systems and methods, some embodiments, incorporate at least one monitoring agent and at least one database to each PoP of the distributed platform. The same monitoring agent therefore performs server-side performance monitoring for each server of the PoP. In some other embodiments, at least one edge server at each PoP of the CDN is enhanced with a monitoring agent. In this configuration, the monitoring agent performs server-side performance monitoring of the content that is sent by the enhanced server to any end user.

In some embodiments, the monitoring agent monitors traffic flows from an edge server at the applications layer (i.e., Layer 7) of the Open Systems Interconnect (OSI) model. Monitoring at the applications layer obfuscates the lower layer flow controls while still allowing the monitoring agent to obtain an effective server-side transfer rate for the content exiting the edge server.

In some embodiments, the performance measurements obtained for a specific end user are quantified into a single metric, such as a numeric score. The measurements or scores are then used to optimize traffic flows that are disseminated to the end users that are serviced by the PoP from which the measurements are taken.

Traffic flow optimization involves adjusting the content that is delivered on the basis of the current network conditions as reflected in the real-time performance measurements. Depending on the type of content, optimization includes selection of an encoding, bitrate, compression, file size, or other variant of the content. In so doing, the bandwidth required to transfer the content from the server to an end user can be adjusted to accommodate measured changes in the performance of the data network over which the content is passed. Optimization may also involve server-side bandwidth throttling. Optimization ensures that end users receive a seamless experience irrespective of the real-time performance of the data network.

Some embodiments support pre-optimization and re-optimization of a traffic flow (i.e., delivery of content). Pre-optimization involves optimizing content prior to the first packet of the content being sent. This ensures a seamless and optimized end user experience from the start which is in contrast to many existing adaptive streaming techniques that start with a high quality setting for the content and then scale back the quality setting for the content based on subsequently measured network performance parameters. Conversely, some adaptive streaming techniques start with a low quality setting for the content and then gradually scale the quality up until it meets the available bandwidth. In any case, current adaptive streaming techniques do not involve pre-optimization.

Pre-optimization is based on a prior measurement of network performance. The prior measurement may have been taken for the same end user that is to receive the content or for another end user that is within the same geographic region as the end user that is to receive the content. Pre-optimization may be conducted using a measurement that is taken for a different end user, because that end user will be in the same geographic region as the one receiving the content based on the above described partitioning of end users through the distributed allocation of PoPs. As a result, the network path from the PoP or more specifically, an edge server in the PoP, to any end user within the same geographic region will by substantially the same, if not exactly the same. In other words, the network path will consist of nearly all or all of the same links or hops that must be traversed in order to deliver the content from the edge server to any end user within the same geographic region. Accordingly, a measurement taken for a first end user in the geographic region will accurately reflect the performance that a second end user in the same geographic region will experience when receiving content from the same PoP of the CDN. The prior measurement is compared to one or more specified performance thresholds. This comparison determines how to optimize the content before sending the content to the requesting end user. For example, when the comparison reveals that the network path is congested, the edge server can optimize the content by selecting a variant of the content that requires less bandwidth to deliver, wherein the selected variant can include higher compression, lower bitrate encoding, and lower resolution as some examples. Once an optimized variant of the content is selected, the transmission of the content to the requesting end user can begin.

Re-optimization involves real-time optimization of content or optimizing content as it is sent. In some embodiments, the monitoring agent begins monitoring a traffic flow once an edge server begins transmitting content to an end user. The monitoring agent takes real-time measurements of the outgoing traffic flow. The edge server obtains the real-time measurements and processes them in order to determine how to optimize the outgoing traffic flow as it is being sent. Specifically, the obtained measurements are compared against one or more specified performance thresholds. The content is then optimized as necessary by continuing to send the same variant of the content or by selecting different variants (e.g., compression, encoding, resolution, etc.) of the content to send. As with pre-optimization, the re-optimization techniques set forth herein differ from those implemented by existing adaptive streaming techniques in that the re-optimization of some embodiments does not involve any end user feedback or the introduction of any specialized packets. Rather, re-optimization is wholly performed based on the rate at which an edge server sends packets.

While the presented systems and methods are applicable to any data network, they are especially well-suited for optimizing traffic flows sent over lossy networks. Lossy networks are those networks that experience high latency and high amounts of packet loss. Data networks operated by wireless service providers, such as 3G and 4G data networks of Verizon, AT&T, and Sprint are examples of some such lossy networks.

For exemplary purposes and for purposes of simplicity, the localized and real-time server-side performance monitoring systems and methods are described with reference to components of a CDN. However, these systems and methods are similarly applicable to any server that hosts and delivers content to a set of end users irrespective of whether the server operates as part of a CDN. Therefore, the systems and methods described herein are not limited solely to implementation in a CDN, though the distributed platform of the CDN is discussed as a platform to maximize the benefits of the systems and methods.

II. Server-Side Monitoring

By leveraging the deployed distributed infrastructure of a distributed platform (e.g., a CDN), the localized and real-time server-side monitoring systems and methods can be embedded within such a distributed platform with minimal modification to the existing infrastructure. Specifically, the systems and methods can be implemented by incorporating at least one monitoring agent and at least one database to each PoP of the distributed platform and by minimally modifying operation of one or more edge servers of each particular PoP to optimize their outgoing traffic flows based on network performance measurements that are derived by the monitoring agent embedded in that particular PoP.

Figure 2:
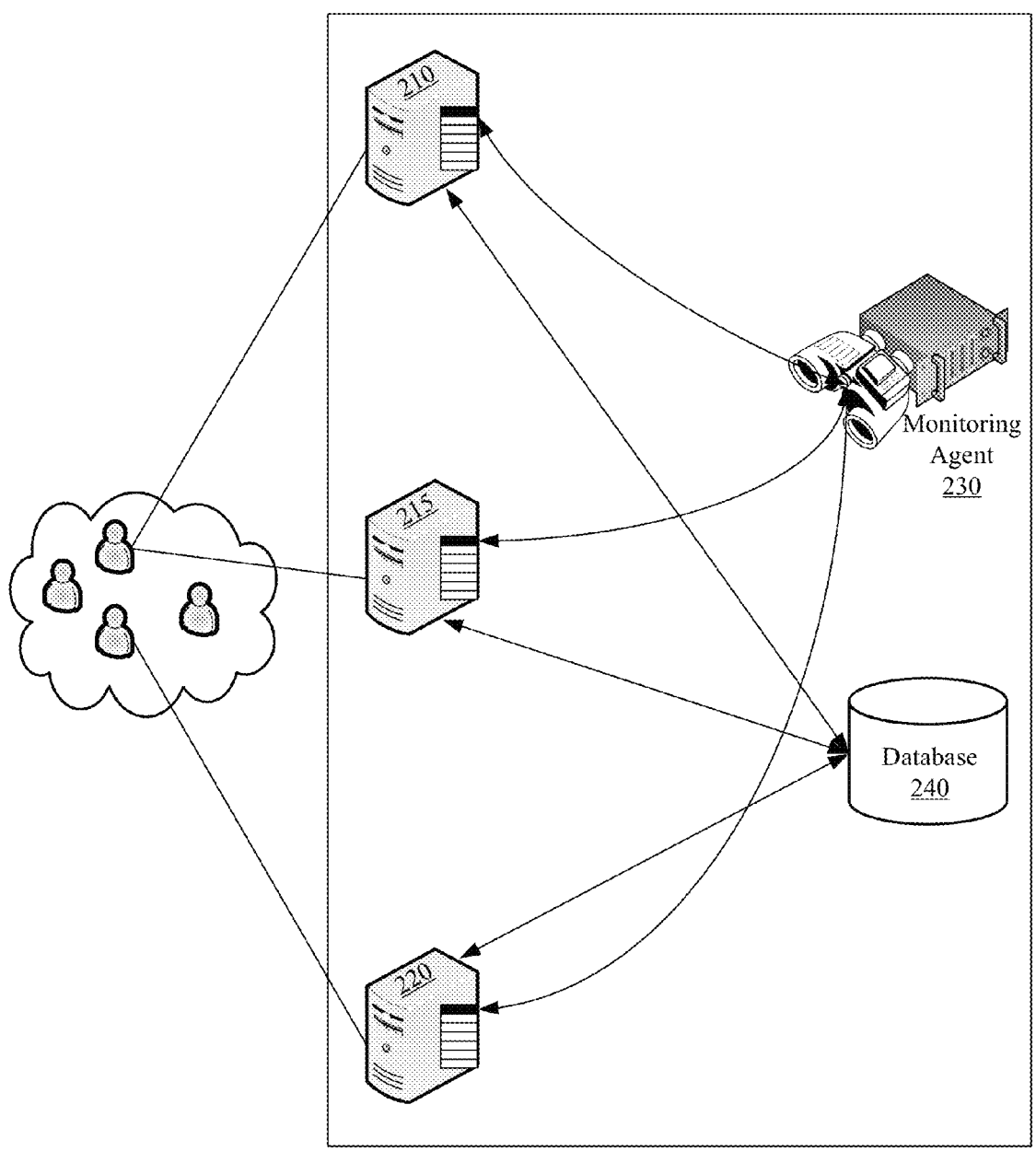
FIG. 2 illustrates the enhancements to a PoP of a distributed platform that enable localized and real-time server-side performance monitoring in accordance with some embodiments.

FIG. 2 illustrates the enhancements to a PoP of a distributed platform that enable localized and real-time server-side performance monitoring in accordance with some embodiments. FIG. 2 illustrates a PoP having three edge servers 210, 215, and 220 that host content on behalf of various content providers and that deliver the hosted content to various end users that are located in one or more regions that are geographically proximate to the PoP. Also illustrated within the PoP is the monitoring agent 230 and the network performance database 240. The monitoring agent 230 is provided access to each of the edge servers 210, 215, and 220. As described in greater detail below, this access allows the monitoring agent 230 to perform server-side monitoring of the outgoing traffic flows from each of the edge servers 210, 215, and 220. Other embodiments may use a single monitoring agent to perform server-side monitoring of outgoing traffic flows from a single edge server in the PoP. The results of the server-side monitoring are stored to the database 240. The edge servers 210, 215, and 220 then retrieve the monitoring results from the network performance database 240 in order to optimize the outgoing traffic flows.

In some embodiments, the monitoring agent is a software module that is encoded as a set of computer executable instructions. The set of computer executable instructions are stored to a non-transitory computer-readable medium of an edge server or a separate virtual or physical machine that is collocated in a PoP with one or more edge servers. Accordingly, even though the monitoring agent 220 is illustrated in FIG. 2 as a separate machine from each of the edge servers 210, 215, and 220, the monitoring agent can be integrated as part of the core caching functions of each of the edge servers 210, 215, and 220 so as to yield an enhanced edge server that is operable to perform both caching functionality and the localized and real-time server-side monitoring in accordance with some embodiments. Various hardware for the machine on which the monitoring agent executes is described in the section entitled "Server System".

To allow the monitoring agent to perform server-side monitoring of an edge server, the monitoring agent is provided access to the protocol stack of the edge server. This access allows the monitoring agent to monitor packets that are received by and sent from the edge server. By monitoring these packets, the monitoring agent is able to derive server-side measurements that detail network performance from the edge server to the end user. For simplicity and for abstraction from the underlying networking mechanisms, the monitoring agent is configured to monitor application layer packets passing through the protocol stacks. This is referred to as Layer 7 monitoring, wherein the seventh layer is in reference to the seventh layer or application layer of the OSI model.

Figure 3:
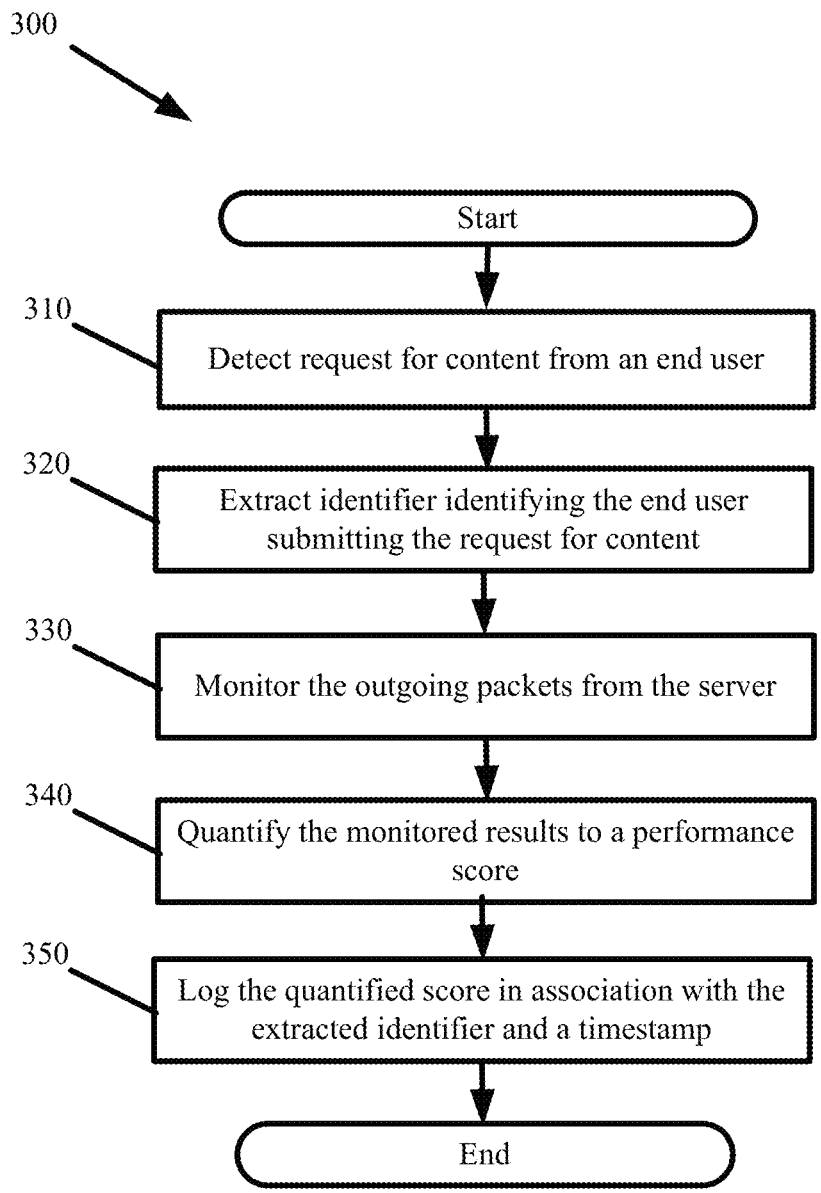
FIG. 3 presents a process performed by the monitoring agent to monitor network performance from an edge server to a particular end user in accordance with some embodiments.

FIG. 3 presents a process 300 performed by the monitoring agent to monitor network performance from an edge server to a particular end user in accordance with some embodiments. The process 300 begins when the monitoring agent detects (at 310) a request for content from the particular end user. Such a request may be encoded as an application layer HyperText Transfer Protocol (HTTP) GET request packet, though the monitoring agent can be configured to detect other requests for content whether at the application layer or other layers in the protocol stack.

Next, the process extracts (at 320) an identifier identifying the end user that submits the request for content. The identifier is ordinarily included within the header of the request packet. One common identifier is the IP address of the end user as encoded within the source IP address header field of an HTTP GET request packet. Optionally, the process may extract additional identifiers that further identify the requesting end user or the region from which the request originates. Such additional identifiers include the "user agent" or autonomous system (AS) number.

As the server begins to pass content back to the end user in response to the request, the process monitors (at 330) the outgoing packets from the server. More specifically, the process monitors the effective rate at which the packets are sent. As earlier noted, this includes monitoring the effective rate at which application layer packets, such as HTTP packets, are sent from the edge server. Monitoring the effective rate of application layer packets provides an accurate measure of the network performance to the end user while obfuscating from the underlying network flow control mechanisms in the protocol stack that regulate the effective rate for the application layer packets. For instance, the Transmission Control Protocol (TCP) is a reliable transport protocol that can be used to transfer application layer packets from a source to a destination. To ensure reliable transport, TCP sends out a first set of packets and awaits acknowledgement of one or more of those packets before sending out any additional packets. In this manner, the underlying TCP controls the effective rate at which application layer packets are sent from the edge server to the end user.

In some embodiments, the effective rate of outgoing packets sent from the edge server to an end user is based on one or more different performance metrics. These performance metrics can include latency, throughput, and packet loss as some examples that collectively can determine the effective rate of transfer. It should be noted that by monitoring the effective rate of the application layer packets, the monitoring agent is able to perform a non-intrusive form of server-side monitoring that obtains real-time performance measurements without injection of any specialized monitoring packets.

The process quantifies (at 340) the results of the monitoring performed at step 330. In some embodiments, quantification involves computing a single score from various measurements obtained as a result of the monitoring. This may include computing a single score to represent the effective rate of outgoing packets from the edge server to a specific end user over a five second duration. This may also include computing a single score based on throughput, bandwidth, and latency measurements that collectively comprise the effective rate of the outgoing packets. The single score is used to reduce the amount of storage that is required to store the performance measurements at the network performance database without losing accuracy of the measurements. In addition to the reduction in the storage requirements, the single score reduces the overhead associated with reading and writing the network performance data to the network performance data. Such efficiency is needed in order to support real-time updating of scores when actively monitoring several thousand end users that may be serviced by a single PoP.

The process logs (at 350) the quantified score in association with the extracted identifier and a timestamp. In some embodiments, the score, identifier, and timestamp are logged to the network performance database. The identifier serves to associate the monitored results or quantified score to a particular end user and more generally, to a geographic region in which the end user associated with the identifier is located and other end users having similar identifiers are located (e.g., IP addresses within the same subnet). The timestamp is a freshness indicator that is used to preserve the real-time freshness of the monitored results and used to ensure that outgoing traffic flows are not optimized based on stale performance data. Though process 300 is shown to terminate after step 350, it is often the case that at least steps 330-350 of the process are continually repeated until the outgoing traffic flow being monitored is complete.

III. Optimization

The scores logged to the network performance database are utilized by the edge servers within the same PoP as the monitoring agent to optimize outgoing traffic flows. This promotes the sharing of derived scores between edge servers such that when a network performance score is computed for content that is sent from a first edge server of a PoP to a first end user, that score can be used to optimize content that is sent from a second edge server of the same PoP to the first end user. Also, that same score can be used to optimize content that is sent from the second edge server of the same PoP to a second end user that is in the same geographic region as the first end user with the network path from the second edge server to the second end user being the same or consisting of substantially the same links or hops as the network path from the second edge server to the first end user.

Figure 4:
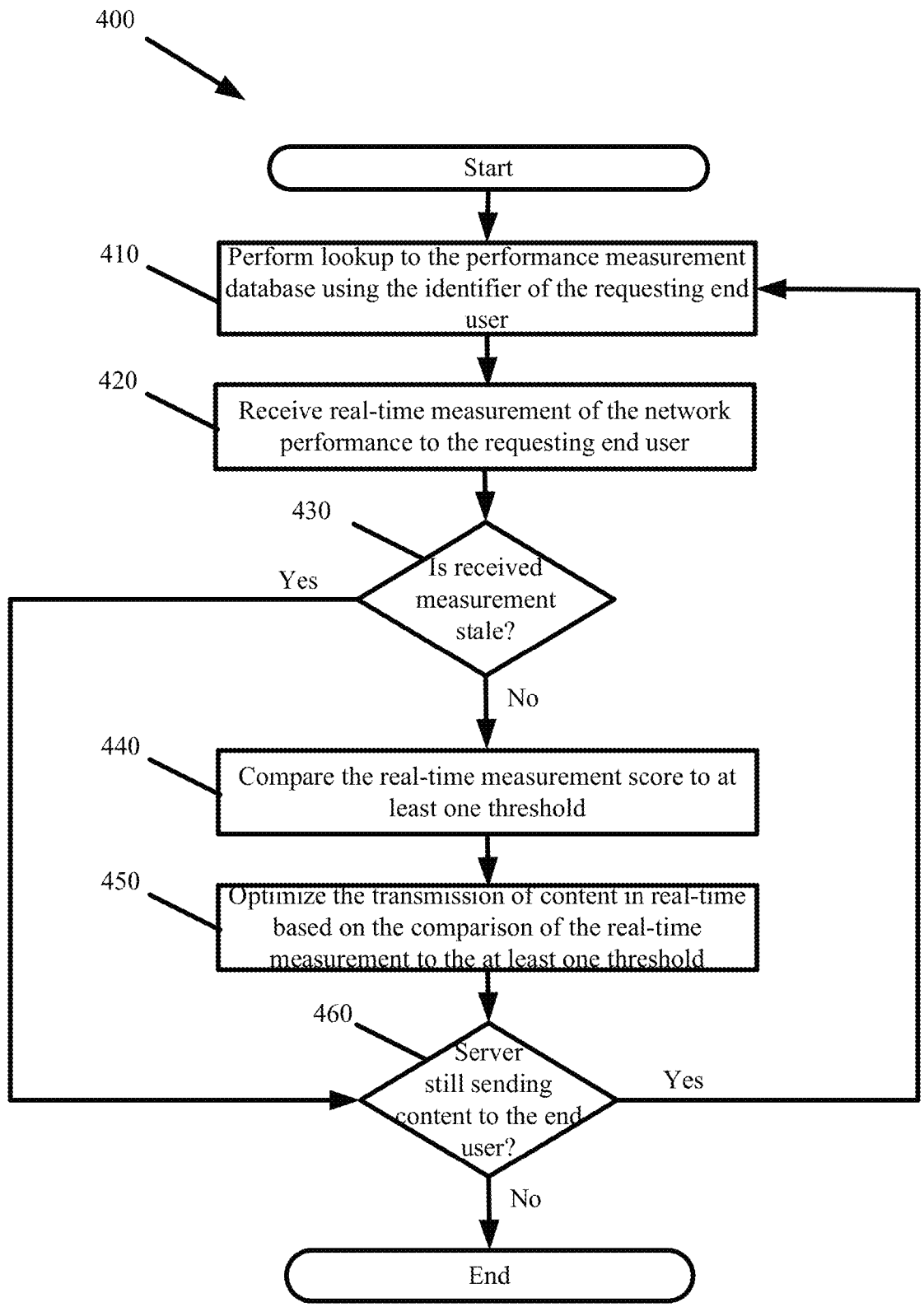
FIG. 4 presents a process for using the derived server-side measurements (i.e., scores) of the monitoring agent to perform re-optimization by optimizing content as it is being delivered from a server to an end user in real-time in accordance with some embodiments.
Figure 5:
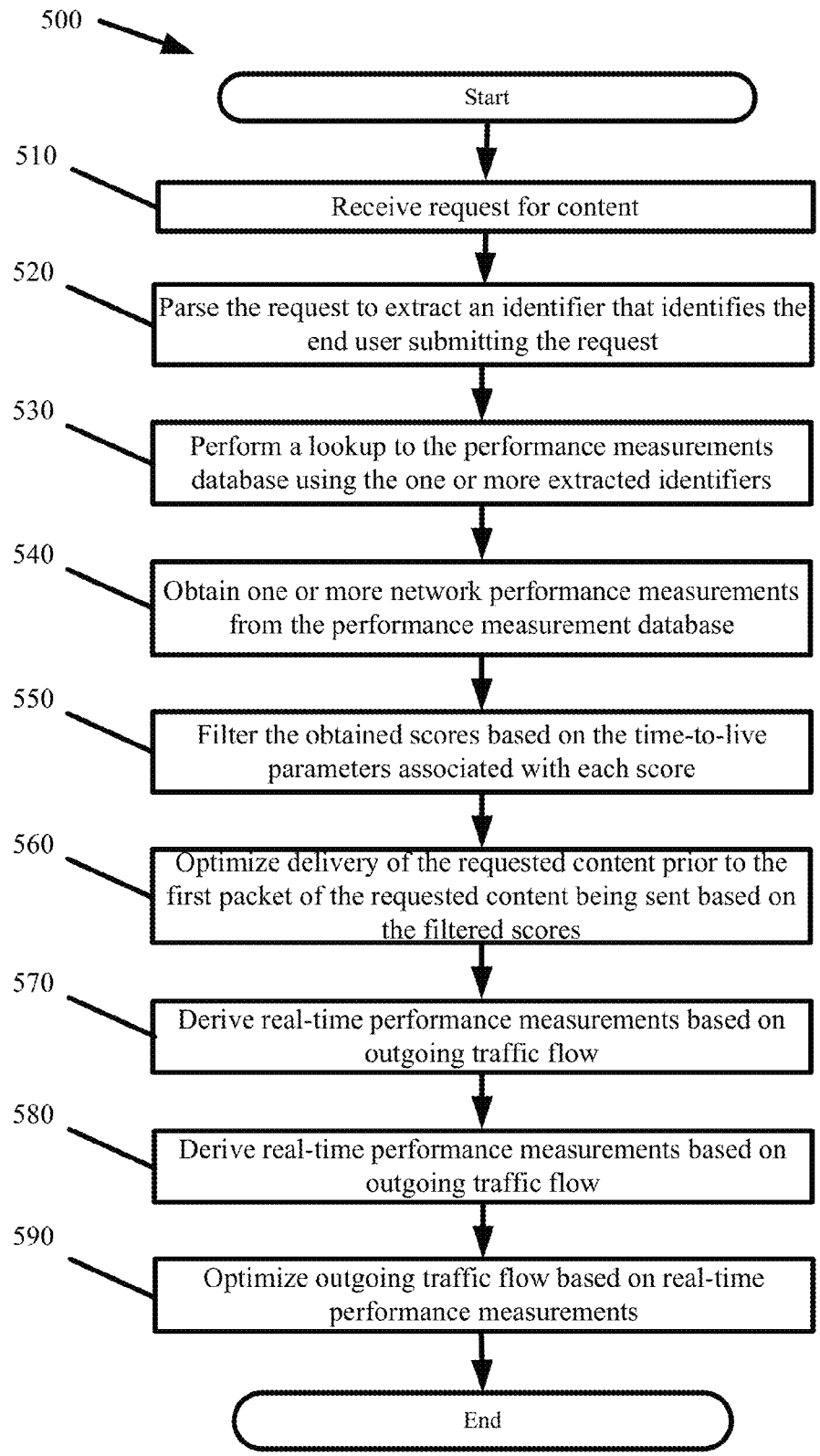
FIG. 5 presents a process for pre-optimizing content based on the server-side monitoring process described with reference to FIG. 3 in accordance with some embodiments, whereby content is optimized prior to the first packet of such content being sent.

In some embodiments, outgoing traffic flows are pre-optimized and re-optimized, wherein pre-optimization involves optimizing content prior to the first packet of that content being sent from the edge server to an end user, and wherein re-optimization involves optimizing content as it is being sent from the edge server to an end user. FIGS. 4 and 5 below describe the modified operation of the CDN edge servers to leverage the logged scores in order to optimize outgoing traffic flows in accordance with some embodiments.

FIG. 4 presents a process 400 for using the derived server-side measurements (i.e., scores) of the monitoring agent to perform re-optimization by optimizing content as it is being delivered from a server to an end user in real-time in accordance with some embodiments. Process 400 can be performed by the same machine performing process 300 when the monitoring agent is integrated as part of the edge server performing content delivery. Alternatively, process 400 can be performed by an edge server that is collocated in the same PoP as the machine running the monitoring agent and performing process 300. Process 400 is performed after the edge server has sent at least the first packet for content requested by an end user.

As the edge server sends the content to the requesting end user, the process performs (at 410) a lookup to the network performance database using the identifier of the requesting end user. This lookup may be performed by the edge server at specified intervals when it is sending content to one or more end users. The identifier is typically the IP address assigned to the end user device that submits the content request. The edge server will have extracted this identifier from the initial content request of the end user. A real-time measurement in the form of a quantified score will exist in the database because the monitoring agent will begin monitoring the server-side performance once the server begins transmitting content to the requesting end user. Accordingly, the process receives (at 420) a score quantifying real-time network performance from the edge server to the requesting end user.

The process checks (at 430) the time-to-live parameter for the received score to ensure that the score received during the current pass through process 400 is not stale or one that was previously used. This check can be performed by simply determining if a specified amount of time has passed since the score was logged to the network performance database or by comparing the time-to-live parameter for the current score to one received during a previous pass through process 400. This latter point is better illustrated with an exemplary reference to a second pass through the process 400. During the second pass through the process 400, the process compares the time-to-live parameter for the score received during the second pass with a time-to-live parameter for a score that was received during a first pass. If these time-to-live parameters specify the same value, then the score (i.e., performance measurement) has not been updated, is thus stale, and no further optimization should be made based on the stale score. If the parameters differ, it is an indication that the process 300 has logged an updated real-time score to the network performance database such that the score received during the current pass can be used to re-optimize the content being sent. In some embodiments, the database runs a routine to delete, remove, or overwrite any stored scores that exceed the time-to-live parameters such that all scores stored to the database are ensured to be real-time relevant. In some such embodiments, the edge server need not perform the real-time relevancy check.

Accordingly, if the received score is determined (at 430) to be stale, the process then determines (at 460) if the server is continuing to send content to the end user. If not, the process ends. Otherwise, the process reverts to step 410 to perform another lookup to the network performance database for an updated real-time performance score.

If the received score is determined (at 430) to be an updated real-time score, the process compares (at 440) the received score to at least one defined threshold and dynamically optimizes (at 450) the transmission of the content in real-time based on the comparison. For instance, a first baseline threshold may be defined to determine when the resources needed to deliver the content exceed those that are currently available. When this first baseline threshold is met, the process optimizes the transmission of the content by reducing the resources that are needed to deliver the content to the end user, thereby decreasing the likelihood of packet loss, buffering, and other performance degradations that would hinder the end user experience. A second baseline threshold may be defined to determine when there are sufficient unused resources in the network. When this second baseline threshold is met, the process optimizes the transmission of the content by increasing the quality of the content being passed to the end user, thereby providing a richer end user experience. Additional thresholds may be set and compared against to provide a gradual optimization of the content.

In some embodiments, the baseline thresholds are set by the edge server operator or the CDN operator based on expected network performance. For example, an initial set of performance measurements are taken when the network is known to not be congested and these measurements are then set as the baseline values for the thresholds. In some embodiments, the baseline thresholds are determined from historic performance measurements that the monitoring agent takes based on previous content delivered to one or more end users of a geographic region. For example, a particular end user requests and receives content from a specific PoP of the CDN and the content is delivered with an average latency of 10 ms at 100 kilobits per second. The baseline threshold can then be derived from these averages.

Common optimization techniques that can be used by the edge server include adaptively increasing or decreasing the bitrate for content being sent to an end user based on different encodings of the same content, increasing or decreasing resolution of the content, increasing or decreasing the amount by which the content being sent is compressed, increasing or decreasing the rate used to send the content, adding or removing objects from the content being sent, or other adjustments to the quality of the content. Each such technique alters the amount of bandwidth that is required to send content, thereby enabling content to be delivered faster when there is less bandwidth available and enabling content to be delivered with better quality when there is more bandwidth available. For example, when streaming media content to the end user, the process optimizes the transmission of the content by increasing or decreasing the quality of the media content in response to the received score by sending the media content using one of several different encodings with each encoding having a different bitrate. This is known as adaptive streaming. As another example, the resolution of images can be increased or decreased in response to the monitored network performance. Accordingly, each edge server stores different variants of the same content, wherein each variant may include a different bitrate encode, compression level, resolution, or other variant. Also, the edge server may choose to send different versions of the same website (e.g., a full version of a website as compared to a mobile version of the website).

Re-optimization is particularly applicable to ongoing sessions between the server and the end user. An ongoing session may include, for example, a media stream that includes streaming or recorded video and/or audio or server-side execution of an application or game, as well as hosting and serving a series of websites or website content that are sequentially or iteratively accessed.

After optimizing the transmission of the content, the process determines (at 460) whether the server is still sending content to the end user. If not, the process ends. Otherwise, the process reverts to step 410. In this manner, the systems and methods perform server-side monitoring to adjust content delivery in real-time, whereby the server-side monitoring is based only on the traffic that is sent from the server to the end user without the need for specialized monitoring packets and without the need for specialized monitoring of the end user response to the outgoing content.

FIG. 5 presents a process 500 for pre-optimizing content based on the server-side monitoring process described with reference to FIG. 3 in accordance with some embodiments, whereby content is optimized prior to the first packet of such content being sent. Process 500 can be performed by the same machine performing process 300 when the monitoring agent is integrated as part of the edge server performing content delivery. Alternatively, process 500 can be performed by an edge server that is collocated in the same PoP as the machine running the monitoring agent.

Process 500 is performed by an edge server whenever the edge server receives a request to initiate the delivery of content to an end user and prior to dissemination of the first packet of the requested content. Accordingly, the process begins by receiving (at 510) a request for content. The following steps of process 500 can be performed in parallel with the server processing the request in order to identify where the requested content is stored (e.g., in cache, on disk, at a remote origin server, etc.).

The process parses (at 520) the request to extract an identifier that identifies the end user submitting the request. In some embodiments, the identifier is the IP address assigned to the end user device submitting the request. In some embodiments, the identifier additionally or alternatively includes an AS number, user agent, etc.

Using the one or more extracted identifiers, the process performs (at 530) a lookup to the network performance database. The lookup identifies any measurements or scores that are derived to measure the network performance to the end user identified by the extracted identifier. The lookup also identifies any measurements/scores that are derived for other end users that are related to the requesting end user. In some embodiments, the relation between end users is determined from the IP addressing that is assigned to the end user devices. For instance, blocks of IP addresses are normally assigned to devices that are geographically proximate to one another. Such IP address blocks are assigned by Internet Service Providers (ISPs) to end users operating within the same or proximate network access service areas. In some embodiments, the relation between end users is determined based on AS number. End users that are routed from the same autonomous system normally gain access through the same network access service area.

The process obtains (at 540) one or more scores quantifying network performance measurements from the network performance database. The process filters (at 550) the scores based on freshness as determined from the timestamp associated with each score and the specified time-to-live parameters. This ensures that the pre-optimization of the traffic flows is based on real-time data whether such data is derived for the end user that is to receive the requested content or for other related end users that are within the same geographic region as the end user that is to receive the requested content.

The filtered scores are then used to optimize (at 560) the delivery of the requested content prior to the first packet of the requested content being sent. Optimization is based on comparing the filtered scores to one or more specified thresholds. The relative comparison of the filtered scores to the specified thresholds determines if the network is congested or otherwise underperforming such that the bandwidth requirements for the content to be delivered should be reduced or if the network has available bandwidth that can support higher quality variants of the requested content. As earlier noted, different content delivery optimizations can be made based on the type of the requested content. For media content, the process can select one of several encodings of the media content based on the filtered scores. The server can then send the selected optimized encoding without having to obtain a measurement directly from the specific end user before beginning the transmission. For image content, the process can select one of several resolutions or levels of compression for the image based on the filtered scores. For other content, the process can select whether to send a full copy of the content, a compressed version of the content, or an incomplete set of the content with extraneous objects omitted to conserve bandwidth based on the filtered scores. As a result of this pre-optimization, end users are less likely to experience buffering when starting playback of media content and are less likely to experience changes in quality at the start of playing media content.

Once the edge server begins dissemination of the pre-optimized content, the process begins monitoring (at 570) the real-time performance of the network, derives (at 580) updated real-time scores to quantify the network performance to the actual end user that receives the content, and re-optimizes (at 590) the outgoing traffic flow based on the updated real-time scores as per the process 400 described above with reference to FIG. 4.

In this manner, systems and methods are provided to use server-side monitoring to optimize outgoing traffic flows from the beginning to the end of the traffic flow. Moreover, such server-side monitoring is non-intrusive in that the monitoring is performed without the introduction of specialized monitoring packets by basing the monitoring solely on the content that is requested and sent from the server to an end user or other end users related to the requesting end user.

Figure 6:
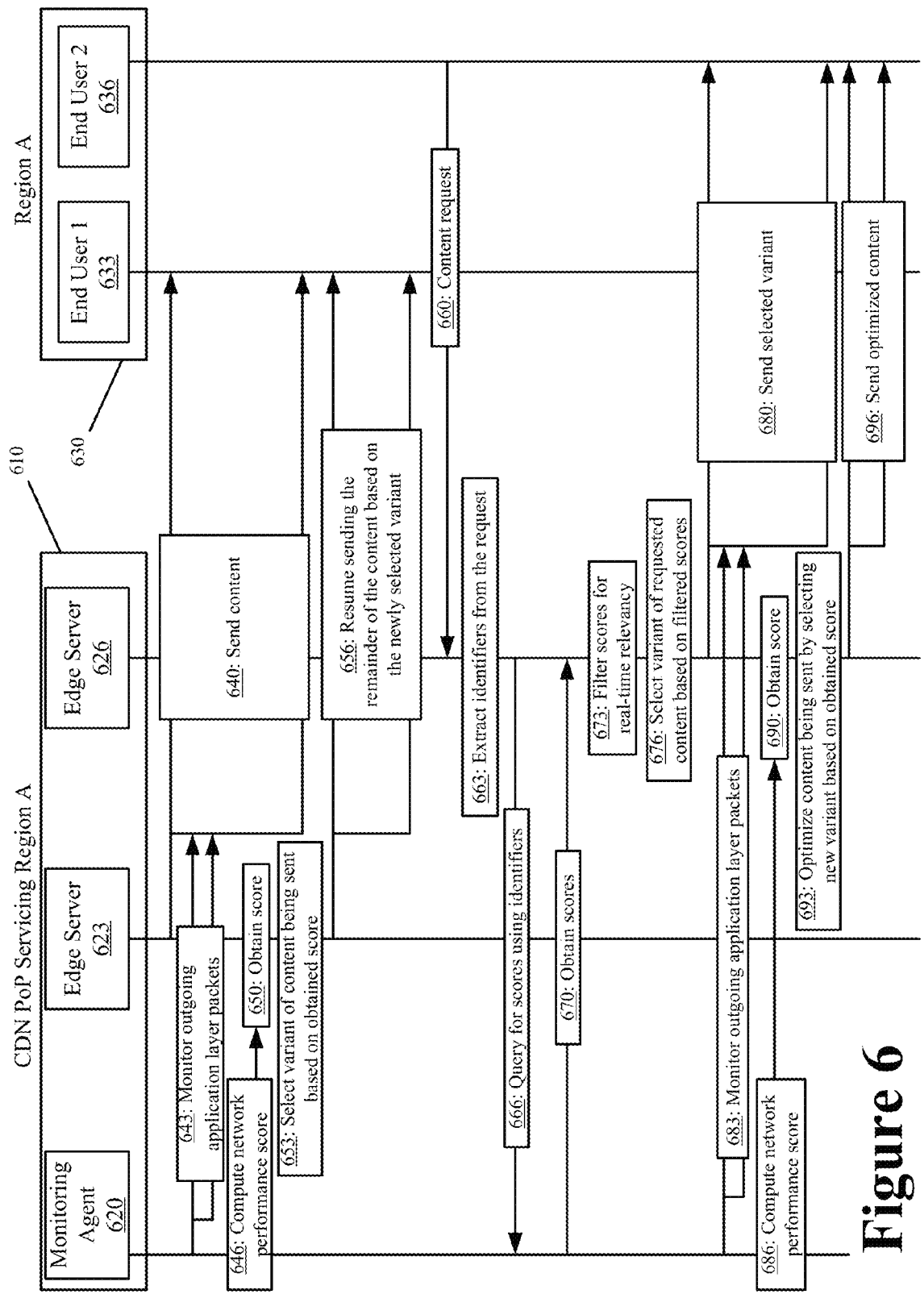
FIG. 6 presents a message exchange diagram to summarize traffic flow optimization using the localized and real-time server-side monitoring systems and methods in accordance with some embodiments.

FIG. 6 presents a message exchange diagram to summarize traffic flow optimization using the localized and real-time server-side monitoring systems and methods in accordance with some embodiments. The figure illustrates a PoP 610 of a distributed platform that is tasked with delivering content to end users 633 and 636 that are located in region 630. The PoP 610 includes a monitoring agent 620, a first edge server 623, and a second edge server 626.

The diagram commences with the first edge server 623 sending (at 640) content to the first end user 633. During this time, the monitoring agent 620 performs server-side monitoring of the first edge server 623 by continually monitoring (at 643) the outgoing application layer packets that are sent from the first edge server 623 to the first end user 633. The monitoring agent 620 computes (at 646) one or more scores to quantify the network performance based on the monitoring of the outgoing packets.

The scores provide a collective quantification for the performance of the network links connecting the first edge server 623 to the first end user 633 and more generally, for the performance of the network links connecting the PoP 610 to the geographic region 630. In other words, content that is sent to any end user in the geographic region 630 will have to traverse the same network links as the content being sent from the first edge server 623 to the first end user 633 such that the computed network performance scores have application not only to the first end user 633, but any end user operating in that region 630.

While still sending the content, the first edge server 623 obtains (at 650) the computed scores from the monitoring agent 620 or an associated database. Filtering of these scores is not necessary as these scores were computed in real-time which may be indicated using a flag or other meta-data or when the database automatically removes or overwrites scores that have exceeded a specified time-to-live. If filtering is to be performed, a comparison of the score's timestamp to a time-to-live parameter will reveal if the score is useable or is stale and should be discarded.

The first edge server 623 uses the real-time relevant scores to optimize the sending of the content to the end user 633. In accordance with processes described above, the first edge server 623 compares the scores against one or more baseline thresholds to determine if the network is congested such that the quality of the content being sent has to be reduced in order to preserve bandwidth or if there is available bandwidth that can be used to improve the quality of the content being sent. Based on the analysis of the obtained scores relative to the baseline thresholds, the first edge server 623 selects (at 653) a different variant for the content being sent and the first edge server 623 resumes (at 656) sending the remainder of the content based on the newly selected variant. For instance, the first edge server 623 may have previously selected a 16 Kbps encoding of an audio stream, but the derived performance measurements reveal an effective transfer rate of 40 Kbps to the first end user 623. The first edge server 623 can then select a different variant for the audio stream which is encoded at 32 Kbps and resume sending that higher quality stream to the first end user 623 while staying within the limits of the network and while improving the end user experience. Further re-optimizations may be made during the continued transfer of the content.

At 660, the second edge server 626 receives a request for content from the second end user 636. Before responding to the request, the second edge server 626 extracts (at 663) one or more identifiers from the request. These identifiers identify the geographic region in which the second end user 636 is located. More specifically, the identifier may be an IP address that can be mapped to a particular ISP and ultimately, to the specific region 630 serviced by that ISP. Similarly, the identifier may be an Autonomous System (AS) number that identifies the specific region 630 in which the second end user 636 is located. Further still, the identifier may be mapped to a subnet that identifies a geographic region.

The second edge server 626 queries (at 666) the monitoring agent 620 or an associated database based on the one or more extracted identifiers to obtain any performance scores quantifying network performance to the identified service region 630. In this example, the monitoring agent 620 has recently computed scores quantifying the network performance from the first edge server 623 to the first end user 633. Since the first end user 633 and the second end user 636 are located in the same geographic region, the network links from the PoP 610 to each of the end users 633 and 636 will be substantially the same, therefore enabling the scores that were derived for the content sent to the first end user 633 to be used for pre-optimizing the content that is to be sent to the second end user 636.

The second edge server 626 obtains (at 670) the scores and filters (at 673) the scores for real-time relevancy. This includes discarding any scores that have an associated timestamp that is exceeds a specified time-to-live parameter. The second edge server 626 then selects (at 676) a variant of the requested content based on the filtered scores and begins sending (at 680) the selected variant to the second end user 636. In this manner, the content requested by the second end user 636 is pre-optimized based on scores quantifying network performance of content delivered to different end users in the same geographic region as the second end user 636. As the second edge server 626 sends (at 680) the content to the second end user 636, the monitoring agent 620 monitors (at 683) the outgoing application layer packets and computes a score (at 686) to quantify the network performance from the second edge server 626 to the second end user 636. The newly computed score is obtained (at 690) by the second edge server 626 and used to optimize (at 693) the content being sent to the second end user by selecting another variant of the content when necessary. For instance, the second edge server 626 may begin sending the audio stream at 32 Kbps based on the earlier measurements derived for content delivery to the first end user 633. Then, new measurements are taken while delivering the requested content to the second end user 636 to reveal that the network condition has degraded to provide an effective transfer rate of 28 Kbps such that the second edge server 626 can re-optimize the audio stream and select the lower quality 16 Kbps variant.

Figure 7:
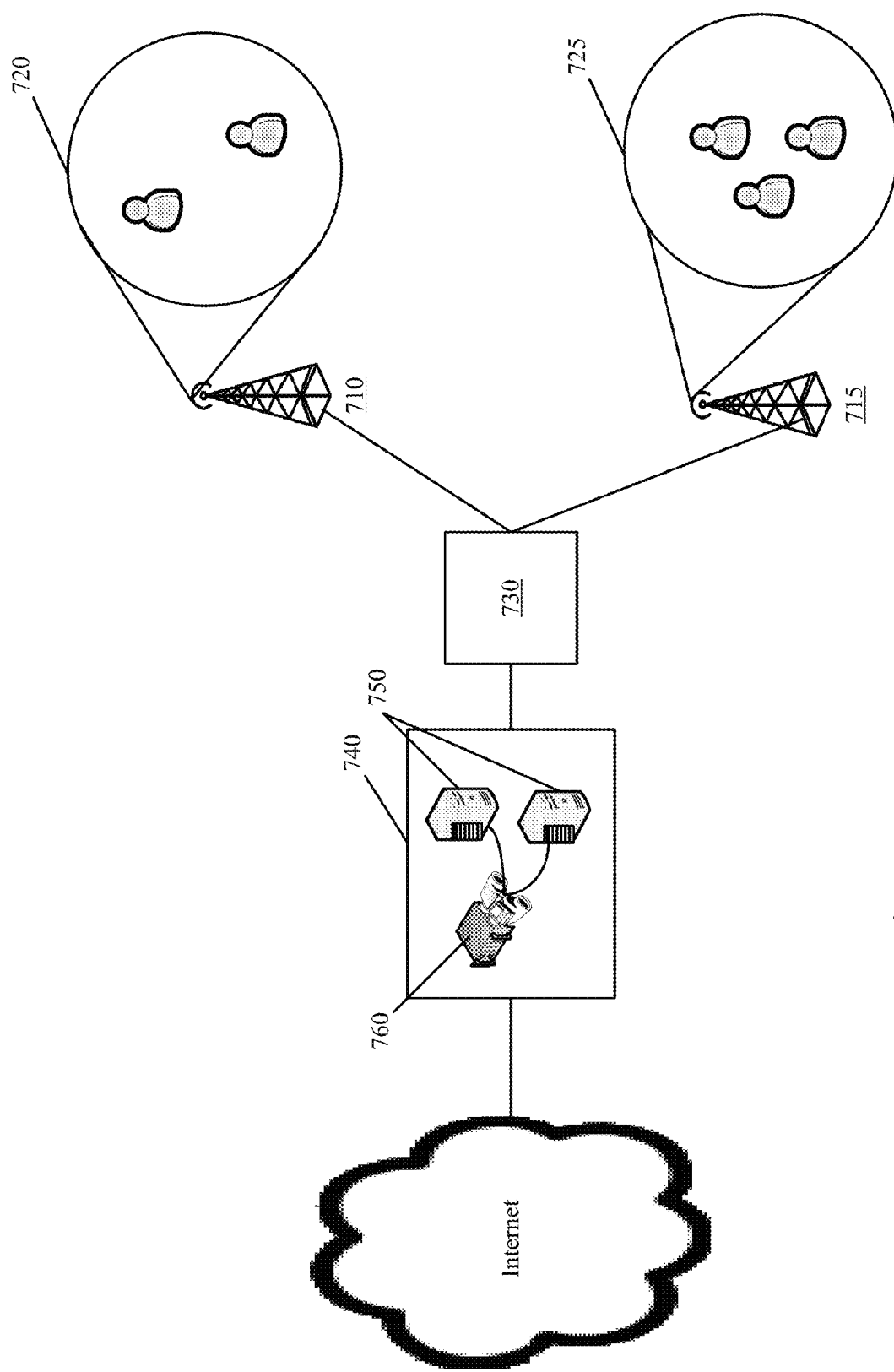
FIG. 7 conceptually illustrates the localized and real-time server-side performance monitoring system operating in the context of a wireless data network.

The above described systems and methods are applicable to any data network, but are especially well-suited for optimizing traffic flows sent over lossy data networks. Lossy data networks are those data networks that experience high latency and high amounts of packet loss. Data networks operated by wireless service providers, such as 3G and 4G data networks of Verizon, AT&T, and Sprint are examples of some such lossy data networks. FIG. 7 conceptually illustrates the localized and real-time server-side performance monitoring system operating in the context of a wireless data network.

The wireless data network includes wireless nodes 710 and 715 that produce wireless service regions 720 and 725. These wireless nodes 710 and 715 include one or more cellular towers and connecting base stations. For a Universal Mobile Telecommunications System (UMTS) data network, the wireless nodes 710 and 715 include one or more Node-Bs and one or more Radio Network Controllers (RNCs) connecting the service regions 720 and 725 to a core network of the wireless service provider. End user subscribers located within the service regions 720 and 725 can use their wireless devices to send and receive content from an external data network, such as the Internet. The core network 730 may include one or more Serving GPRS Support Nodes (SGSNs) and one or more Gateway GPRS Support Nodes (GGSNs). Though only two wireless nodes 710 and 715 are shown, the core network 730 can connect several additional wireless nodes to the external data network and can thus experience large traffic loads.

By locating a CDN PoP 740 adjacent to the core network 730 of wireless service provider, the PoP 740 is ideally positioned to optimize the traffic flows passing between the core network 730 and the external data network. Specifically, the PoP 740 includes a set of edge servers 750 and a monitoring agent 760. The monitoring agent 760 monitors the outgoing traffic flows from the PoP 740 to any end user in the service regions 720 and 725 and the monitoring agent 760 computes scores quantifying network performance to these service regions 720 and 725. The set of edge servers 750 can then optimize the content that they send to any end user in these service regions 720 and 725 irrespective of whether the scores were computed for that end user or a different end user, because the network links connecting the PoP 740 to the service regions 720 and 725 will remain the same. In this manner, the PoP 740 sends continually optimized content that is adjusted based on real-time network conditions of the service regions 720 and 725. Moreover, such monitoring and optimization of the wireless service regions 720 and 725 occurs without introducing any monitoring packets or other packets beyond those satisfying content requests of the end users. Therefore, when the monitoring agent 760 detects that service region 720 is congested, the set of edge servers 750 can select a variant of requested content that minimizes the bandwidth required to send that content to the service region 720. As noted above, identifying end users in the service region 720 can be predicated based on IP addresses, subnets, or AS numbers. Moreover, the PoP itself is limited to servicing end users within one or more neighboring service regions such that if one service region is congested, then it is likely that the neighboring service regions are also subject to the same congestion.

Thus, when either service region 720 or 725 becomes congested, the PoP 740 can adjust its traffic flows to the service regions 720 and 725 in real-time by decreasing the bandwidth required for those traffic flows to ensure that all end users receive an uninterrupted experience. Conversely, when either service region 720 or 725 experiences low loads, the PoP 740 can adjust its traffic flows to the service regions 720 and 725 in real-time by increasing the bandwidth required for those traffic flows to provide the end users with a richer experience.

IV. Server System

Many of the above-described processes and components are implemented as software processes that are specified as a set of instructions recorded on non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 8:
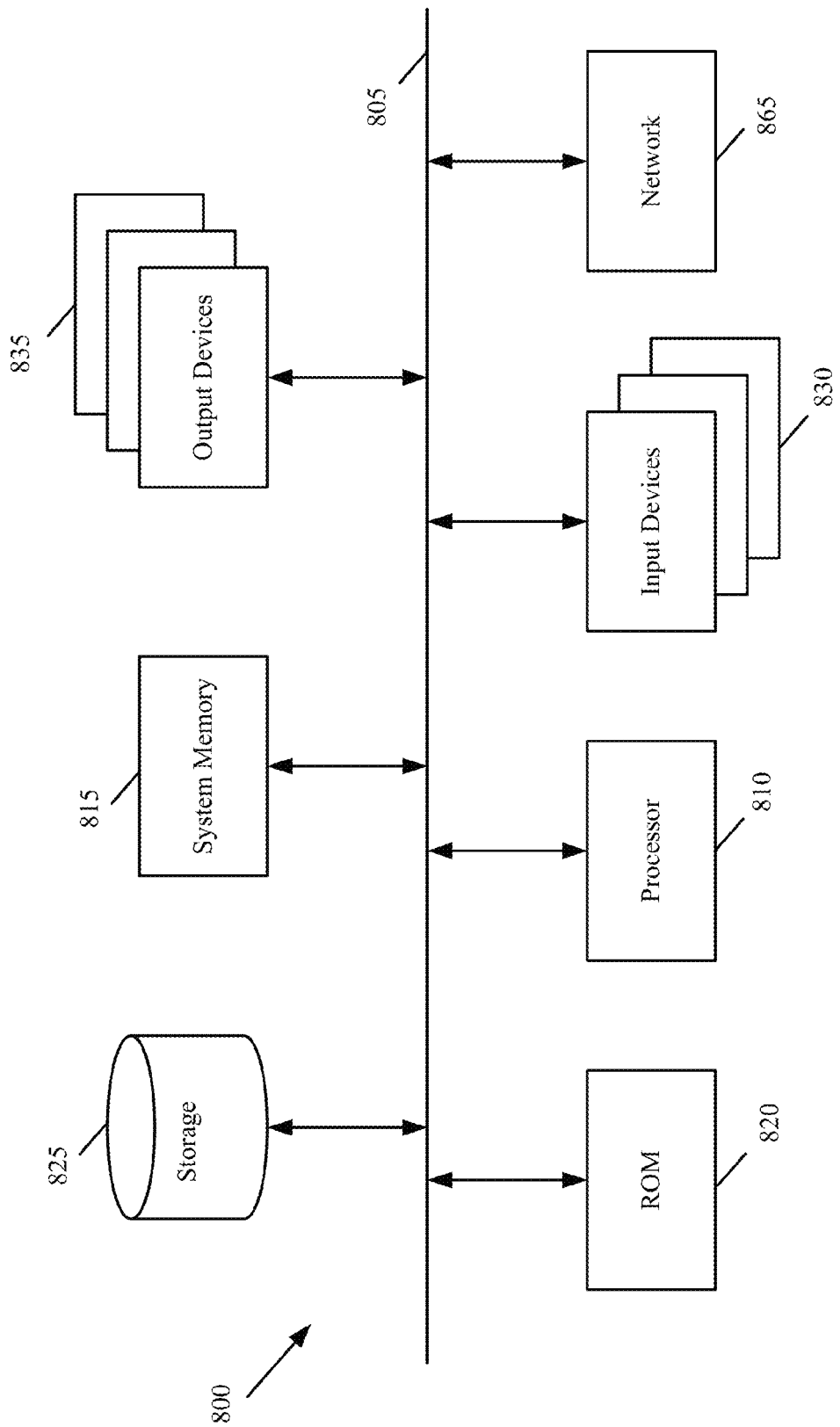
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the server-side monitoring systems and methods (i.e., monitoring agent, edge server, edge server enhanced with a monitoring agent, etc.) described above. Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device. Like the permanent storage device 825, the system memory 815 is a read-and-write memory device. However, unlike the storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include, but are not limited to, alphanumeric keypads (including physical keyboards and touchscreen keyboards) and pointing devices (also called "cursor control devices"). The input devices 830 also include, but are not limited to, audio input devices (e.g., microphones, MIDI musical instruments, etc.). The output devices 835 display images generated by the computer system. The output devices include, but are limited to, printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method for optimizing content delivery to a service region of a data network, the computer-implemented method comprising:
    at a Point-of-Presence (PoP) of the data network with at least one server that services users in the service region:
        receiving a request identifying content that is requested by a particular user that operates in the service region;
        serving a first part of the content from a first variant of a plurality of variants of the content, wherein the plurality of variants comprise different sized encodings of the content;
        determining an effective rate at which said content is transferred to the particular user based on a rate at which packets of the first variant exit the PoP to the particular user;
        serving a second part of the content from a second different variant of the plurality of variants based on the effective rate, wherein the second variant provides an improved user experience at the effective rate than the first variant at the effective rate.

2. The computer-implemented method of claim 1, wherein determining the effective rate comprises monitoring application layer packets for the first variant of the content that exit the PoP.

3. The computer-implemented method of claim 1, wherein the first variant and the second variant of the content comprise at least one of a different bitrate, encoding, compression level, and resolution for the content.

4. The computer-implemented method of claim 1 further comprising selecting the second variant to have a smaller file size encoding than the first variant when serving the first variant at the determined effective rate does not provide the particular user with a predetermined user experience.

5. The computer-implemented method of claim 4 further comprising selecting the second variant to have a larger file size encoding than the first variant when serving the first variant at the determined effective rate does not use an available maximum rate to the particular user.

6. The computer-implemented method of claim 1 further comprising configuring any of a plurality of caching servers of said PoP to cache and serve the plurality of variants for said content.

7. The computer-implemented method of claim 6 further comprising configuring a monitoring agent of said PoP to monitor the effective rate at which any of the plurality of caching servers send content packets to users in the service region.

8. The computer-implemented method of claim 1 further comprising selecting the first variant of the content to serve for the first part of the content based on an effective rate that was determined when serving, prior to said request, content to any of the users that operate in the same service region as the particular user.

9. A computer-implemented method performed within a particular Point-of-Presence (PoP) of a distributed platform comprising a plurality of PoPs with each PoP comprising at least one server operating to serve content to a plurality of users, the computer-implemented method comprising:
  determining an effective transfer rate at which first content is transferred from the particular PoP to a service region based on a rate at which packets encoding the first content exit the particular PoP to a first user that operates from the service region;
  receiving a request comprising a first identifier identifying a second user that operates from the service region and a second identifier identifying second content requested by the second user;
  retrieving the effective transfer rate to the service region using the first identifier;
  selecting according to the effective transfer rate, a particular variant from a plurality of variants of the second content that is cached to the particular PoP, wherein the plurality of variants comprise different sized encodings of the second content, and wherein the particular variant provides an improved user experience at the effective transfer rate than other variants of the plurality of variants at the effective transfer rate; and
  serving the particular variant of the second content in response to said request.

10. The computer-implemented method of claim 9, wherein the first user is the same as the second user.

11. The computer-implemented method of claim 9, wherein the first user is different than the second user.

12. The computer-implemented method of claim 9 further comprising quantifying the effective transfer rate as a score.

13. The computer-implemented method of claim 12 further comprising storing the score with a timestamp to a database of the particular PoP.

14. The computer-implemented method of claim 9, wherein the effective transfer rate is a first effective transfer rate, the method further comprising monitoring a second effective transfer rate at which the particular variant of the second content is transferred from the particular PoP to the service region based on a rate at which packets encoding the particular variant of the second content exit the particular PoP to the second user.

15. The computer-implemented method of claim 14 further comprising interrupting said serving of the particular variant of the second content and continuing serving a different variant from the plurality of variants of the second content, wherein the different variant provides an improved user experience at the second effective transfer rate than the particular variant and other variants of the plurality of variants at the second effective transfer rate.

16. The computer-implemented method of claim 14 further comprising overwriting in a database of the particular PoP, the first effective transfer rate with the second effective transfer rate such that the effective transfer rate from the particular PoP to the service region is identified as the second effective transfer rate.

17. The computer-implemented method of claim 14, wherein said request is a first request, the method further comprising responding to a second request comprising a first identifier identifying a user that operates from the service region and a second identifier identifying third content, wherein responding to the second request comprises (i) retrieving the second effective transfer rate based on the first identifier of the second request, (ii) selecting a particular variant from a plurality of variants for the third content that is optimal for the second effective transfer rate, and (iii) serving the particular variant of the third content to the user.

18. A server cluster for a data network servicing end users in a service region of the data network, the server cluster comprising:
  a first caching server serving first content to at least one user that operates from the service region;
  a monitoring agent determining an effective transfer rate to the at least one user based on a rate at which packets encoding the first content exit the server cluster; and
  a second different caching server responding to a request comprising a first identifier identifying a particular user that operates from the service region and a second identifier identifying second content requested by the particular user, wherein the second caching server responds to the request by (i) retrieving the effective transfer rate using the first identifier, (ii) selecting a particular variant from a plurality of variants for the second content that is optimal for the effective transfer rate, and (iii) serving the particular variant of the second content to the particular user.

19. The server cluster of claim 18 further comprising a database storing the effective transfer rate and providing the effective transfer rate to the first caching server when the first caching server receives a request from a user that operates from the service region and to the second caching server when the second caching server receives a request from a user that operates from the service region.

20. The server cluster of claim 18, wherein the monitoring agent further computes a score quantifying network performance along links over which content is sent from the server cluster to the particular user.

21. The server cluster of claim 18, wherein the first caching server comprises an Open Systems Interconnection (OSI) compatible protocol stack, and wherein the monitoring agent determines the effective transfer rate by monitoring application layer packets produced by the protocol stack.

* * * * *